(12) United States Patent
Ajam

(10) Patent No.: US 12,403,855 B2
(45) Date of Patent: Sep. 2, 2025

(54) MODULAR RUGGED GRILLE GUARD

(71) Applicant: Black Horse Off Road of GA, Inc., Royston, GA (US)

(72) Inventor: Fadi Ajam, Forest Hills, NY (US)

(73) Assignee: Black Horse Off Road of GA, Inc., Royston, GA (US)

( * ) Notice: Subject to any disclaimer, the term of this patent is extended or adjusted under 35 U.S.C. 154(b) by 92 days.

(21) Appl. No.: 18/430,173

(22) Filed: Feb. 1, 2024

(65) Prior Publication Data
US 2025/0249854 A1    Aug. 7, 2025

(51) Int. Cl.
*B60R 19/52*    (2006.01)

(52) U.S. Cl.
CPC .................... *B60R 19/52* (2013.01)

(58) Field of Classification Search
CPC ... B60R 19/54; B60R 19/52; B60R 2019/522; B62D 65/16
USPC ................. 293/115, 118, 142, 145
See application file for complete search history.

(56) References Cited

U.S. PATENT DOCUMENTS

| | | | |
|---|---|---|---|
| 4,671,552 A | 6/1987 | Anderson et al. | |
| 5,326,142 A * | 7/1994 | Dodds ..................... | B60R 19/52 293/115 |
| 7,246,832 B2 | 7/2007 | Cobble et al. | |
| 7,306,271 B2 | 12/2007 | Kang et al. | |
| 8,801,058 B2 | 8/2014 | Hanson et al. | |
| 2014/0021328 A1 | 1/2014 | Higgs | |
| 2019/0291673 A1 * | 9/2019 | Ajam ..................... | B60Q 1/302 |

FOREIGN PATENT DOCUMENTS

JP        H0995192 A        4/1997

OTHER PUBLICATIONS

Webpage: Peter Taraborelli, Silicone Rubber Gasket 101 | Materials, Properties, Applications, Jul. 5, 2021, https://www.mercergasket.com/silicone-rubber-gaskets-101/ (Year: 2021).*

* cited by examiner

*Primary Examiner* — Jason S Daniels
(74) *Attorney, Agent, or Firm* — Tatonetti IP

(57) ABSTRACT

A modular rugged grille guard is configured to be separated into individual components to reduce the amount of space when packaging the product, which also helps with storage and transportation costs. While the grille guard's main body may be largely assembled, it is separated from opposing left and right upright bars. To assemble, the user attaches the left and right upright bars on opposing sides of the main body, then places the left and right brush guards adjacent to the positioned left and right upright bars, respectively. Once the main body, upright bars, and brush guards are assembled, and their various holes are aligned, the user engages nuts, bolts, screws, washers, etc., to fully attach each section together. In typical implementations, the user may assemble one side at a time.

14 Claims, 9 Drawing Sheets

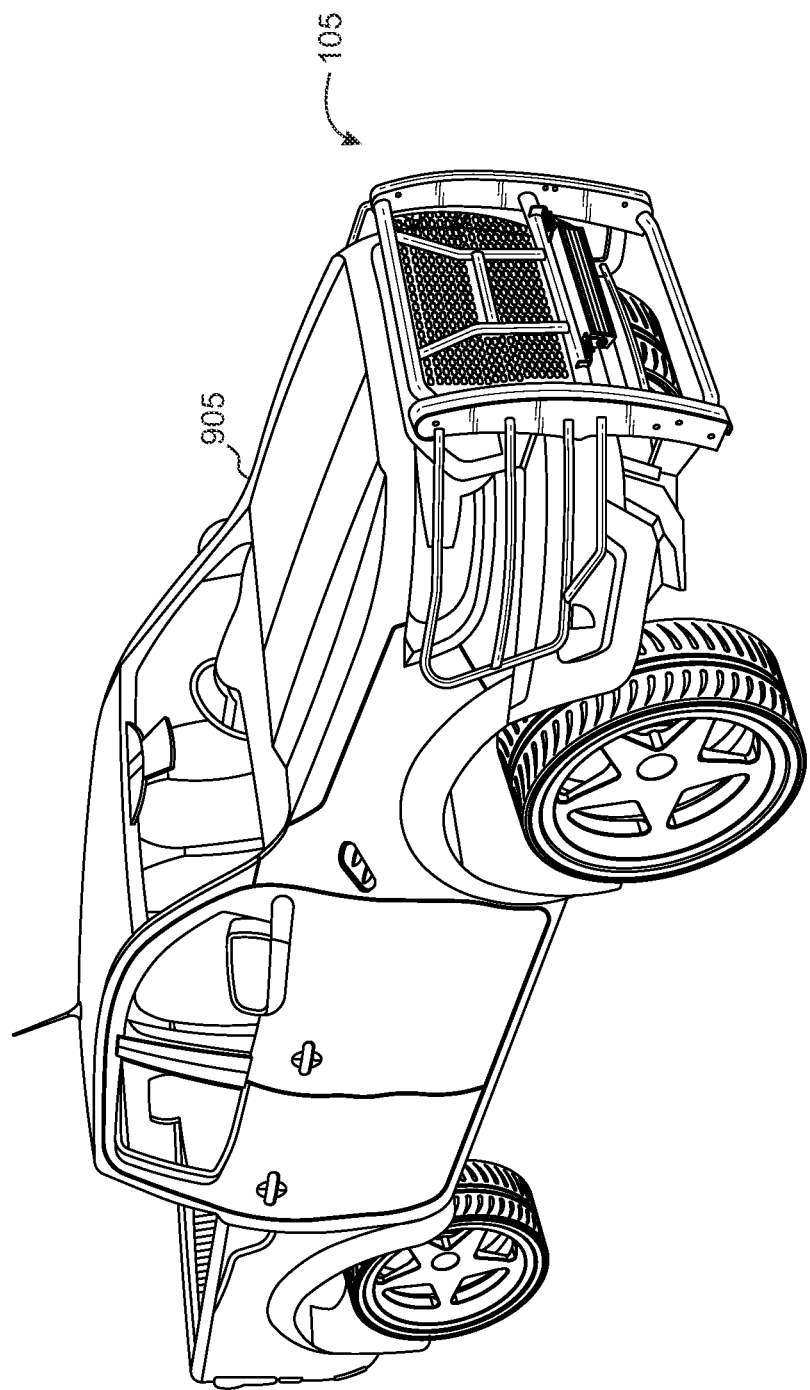

MODULAR RUGGED GRILLE GUARD

CROSS-REFERENCES TO RELATED APPLICATIONS

This Non-Provisional Patent Application is related to co-pending and co-filed patent application Ser. No. 18/430,143, filed contemporaneously herewith on Feb. 1, 2023, entitled "Modular Classic Grille Guard," the entire contents of which is hereby incorporated herein by reference.

BACKGROUND

Vehicle accessories, such as grille guards attached to the front of a vehicle, are often assembled and delivered without sufficient regard for efficiency. For example, classic grille guards may come in three attachable components—the right and left brush guards and the crossbars. Even more, rugged grille guards may typically come as one fully assembled piece.

Users may deploy grille guards for aesthetics, to prevent more significant damage from collisions, and deflect oncoming debris, among other reasons. However, packaging, storing, and transporting such an assembly of components can be costly due to the overall girth of the assembled package, thereby occupying unnecessary real estate during storage and transportation and preventing larger numbers from being trafficked.

SUMMARY

A modular rugged grille guard is configured to be separated into individual components to reduce the amount of space when packaging the product, which also helps with storage and transportation costs. While the grille guard's main body may be largely assembled, it is separated from opposing left and right upright bars. To assemble, the user attaches the left and right upright bars on opposing sides of the main body, then places the left and right brush guards adjacent to the positioned left and right upright bars, respectively. Once the main body, upright bars, and brush guards are assembled and their various holes are aligned, the user engages nuts, bolts, screws, washers, etc., to fully attach each section together. In typical implementations, the user may assemble one side at a time.

Once the upright bars and brush guards are assembled with the main body, the user can attach an LED light and its guard to a bottom section of the main body, specifically at an LED bracket that may be pre-installed (given its small size) or user-installed at the main body. The installed LED bracket and the LED guard are pre-designed to mate with each other so that, once aligned in place, the pieces can be attached with a nut and bolt. In some implementations, the LED light may be optional. Left and right mounting brackets are aligned with their respective holes on the left and right upright bars and then secured with nuts and bolts. Finally, the user can attach the bottom tube (generally referred to herein as a "crossguard") that runs horizontally between the upright bars. While a single bottom tube or cross guard may be used, additional cross guards are also possible, depending on the implementation.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

FIG. 9 shows an illustrative representation of the assembled modular rugged grille guard attached to a vehicle.

Like reference numerals indicate like elements in the drawings. Elements are not drawn to scale unless otherwise indicated.

DETAILED DESCRIPTION

Figure 1:
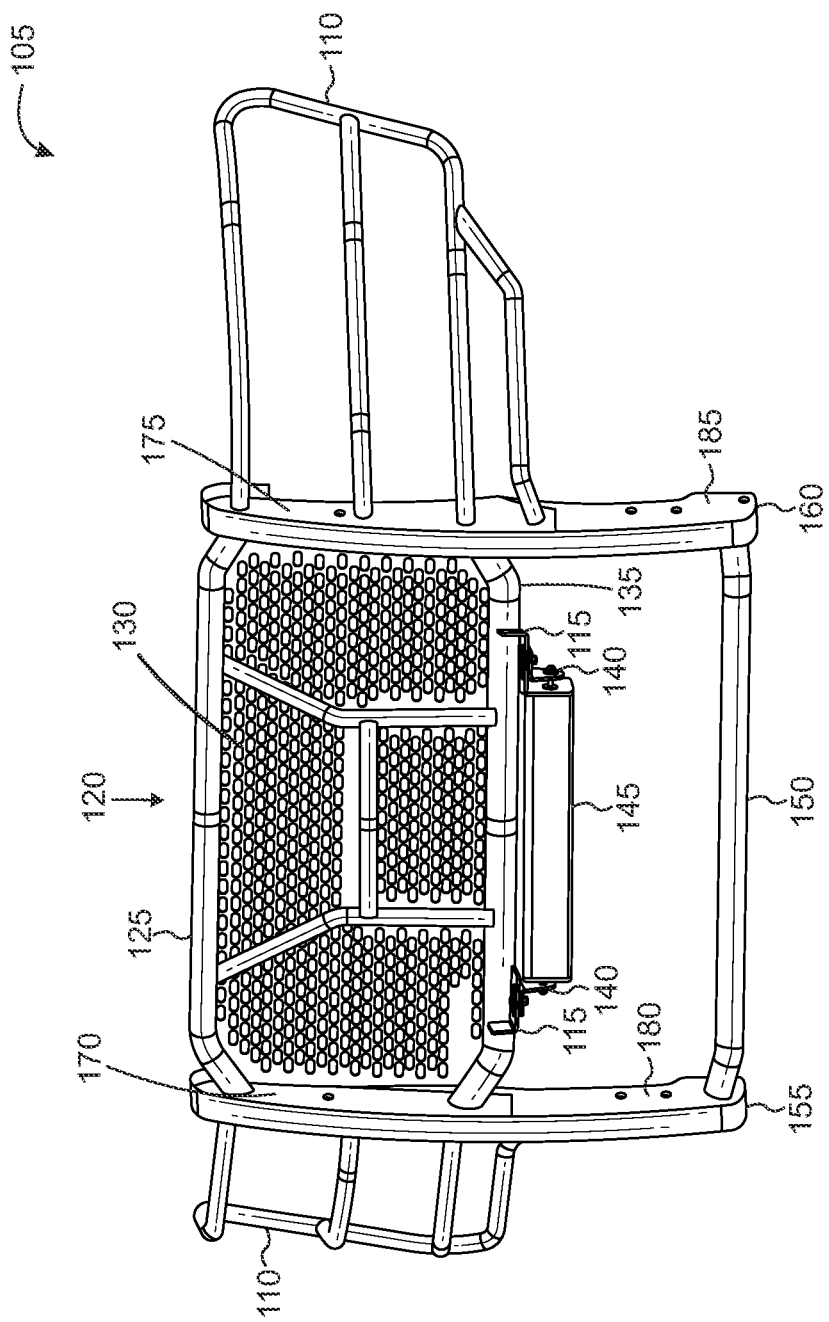
FIG. 1 shows an illustrative representation of an assembled modular rugged grille guard.
Figure 2:
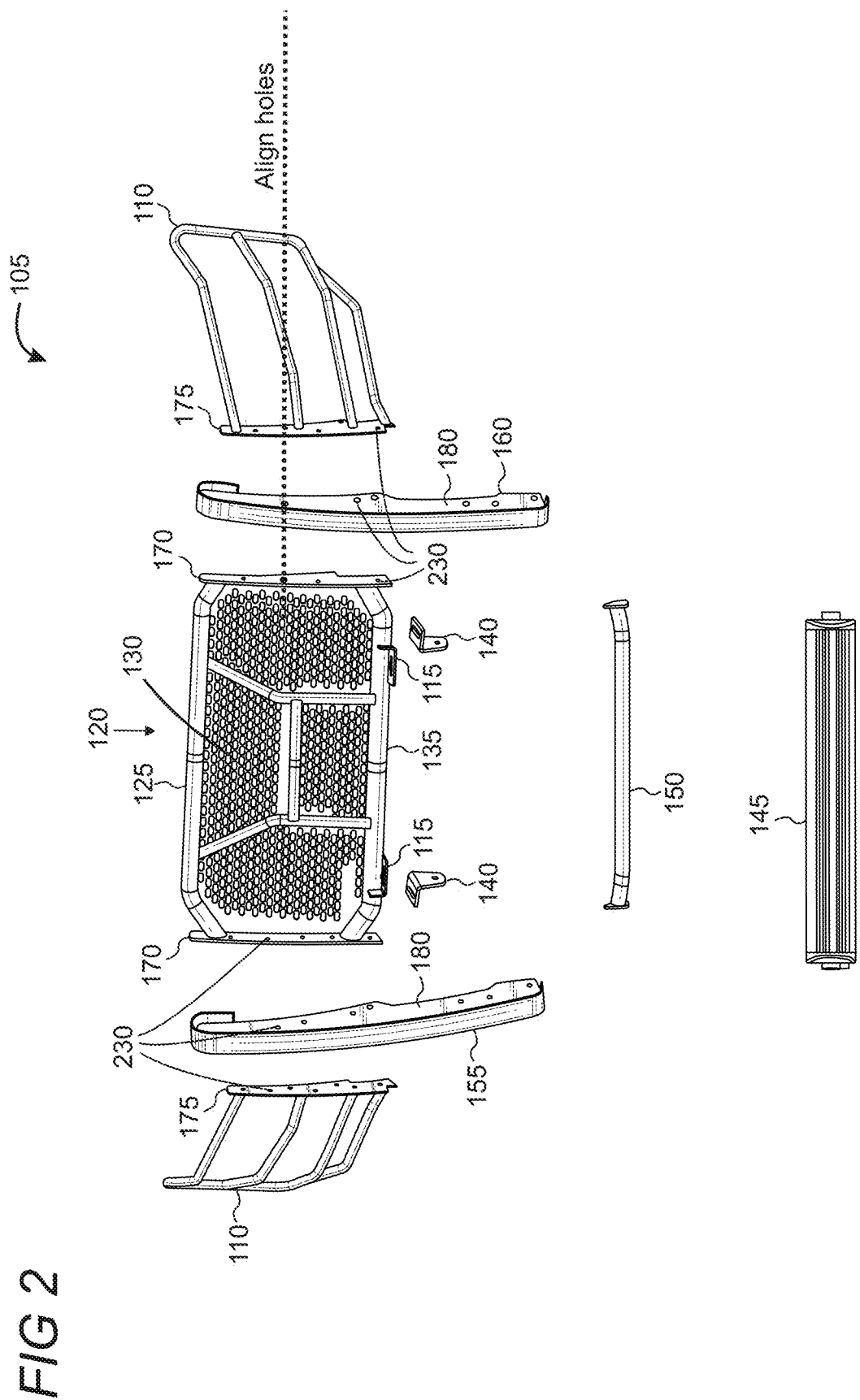
FIG. 2 shows an illustrative exploded view of the modular rugged grilled guard.

FIGS. 1 and 2 show illustrative representations of a modular rugged grille guard 105 and an exploded view of the modular grille guard, respectively. Grille guards are typically attached on the front end of a truck for various reasons, including aesthetics, to enhance safety for passengers during collisions, to reduce damage to the truck's fenders, grille, and under-the-hood component (e.g., radiator, engine, etc.) during collisions, among other reasons. Users often purchase grille guards as an after-the-fact accessory for their vehicle and, therefore, may assemble and attach the grille guard themselves or hire a mechanic. The grille guard's components may typically be made of metal, but other materials, such as plastic or other suitable polymer, are also possible.

The modular rugged grille guard 105 includes left and right brush guards 110, upright bars 155, 160, and a main body 120. References to "left" and "right" members, such as left brush guards, right brush guards, left upright bars, and right upright bars, are from the perspective of looking directly at the drawings as if looking at the vehicle, as opposed to being within the vehicle. As the grille guard 105 is substantially symmetrical, the left and right brush guards have been given the same reference numeral since their configurations are similar.

The left and right brush guards 110 attach to respective upright bars 155, 160 on opposite sides of the main body 120. The main body 120 includes an upper crossbar 125, a grille 130, and a lower crossbar 135. The left and right brush guards include an elongated plate 175 that is used to engage with the upright bars, as discussed in greater detail below. The upright bars 155, 160 each have various holes 130 to enable screws or bolts to assemble the modular grille guard 105 together. The bottom tube 150 or crossguard attaches to each upright bar 155, 160 on its opposing ends. While a single crossguard 150 is shown, additional crossguards may also be used and attached to opposing upright bars similarly, depending on the rugged grille guard's aesthetics and/or specific configuration. In some implementations, there may be no crossguards and only a main body 120. Similarly, the main body may be configured with a different arrangement of upper and lower bars, grille, etc., but may still be configured as discussed herein.

The modular rugged grille guard also includes mounts 115 pre-attached to the lower tube 135 of the main body 120. The mounts may be, for example, welded to a bottom portion of the lower tube to maintain its strength against the grille guard's overall structure. Brackets 140 respectively attach to mounts 115 with, for example, nuts and bolts, which are then used to attach the LED (light emitting diode) light 145, as discussed in greater detail below. Once the LED light is assembled to the main body 120, the bottom tube 150 or crossguard is attached on its opposing ends to opposing upright bars 155, 160. Although a single crossguard 150 is shown, additional crossguards may be implemented depending on the specific design. For example, the main body 120 may be larger or smaller, resulting in more or less crossguards. Additional crossguards and sizes of the main body would be configured similarly as discussed herein.

Figure 3:
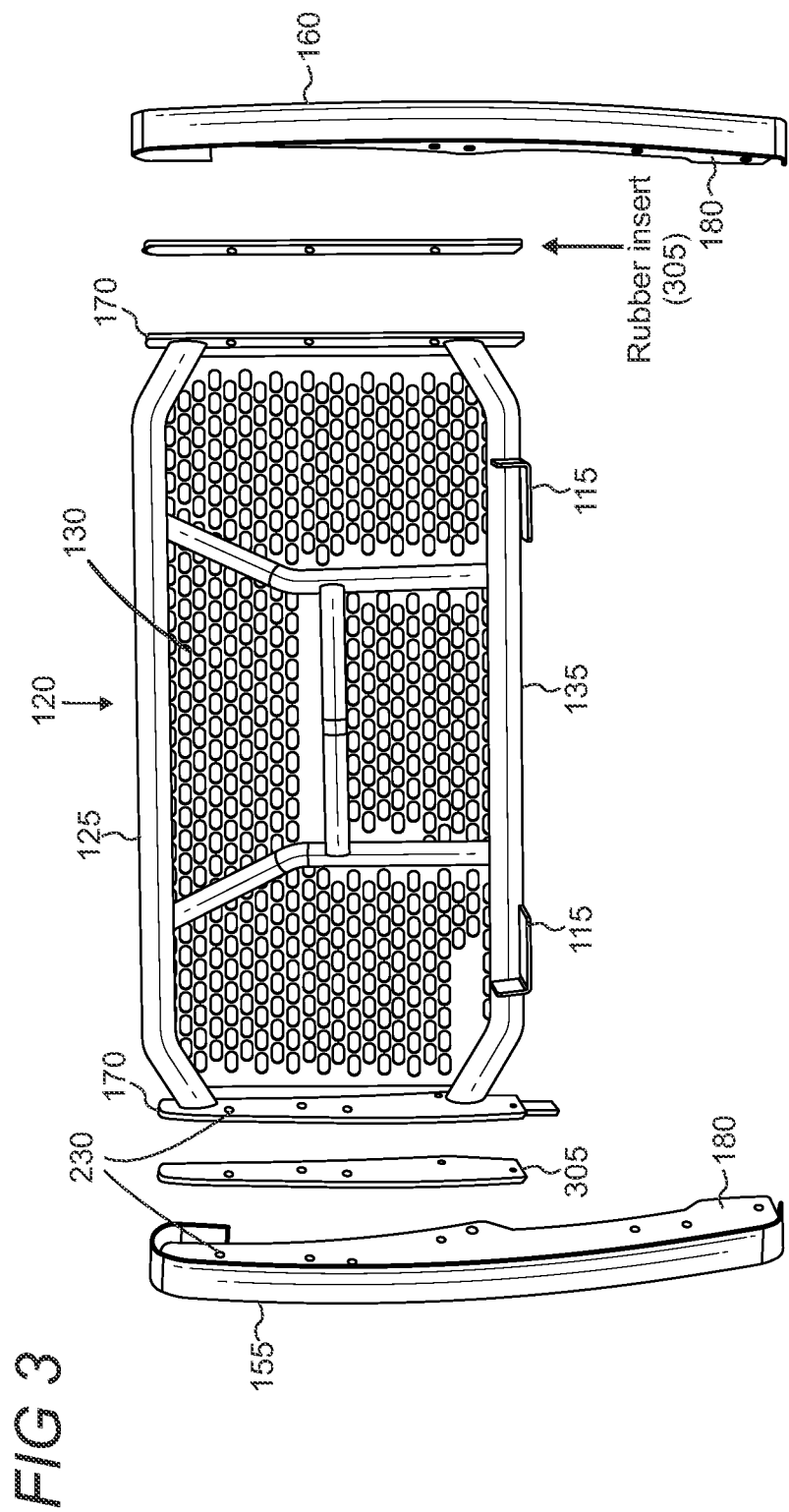
FIG. 3 shows an illustrative representation of the upright bars aligned with the main body.

FIG. 3 shows an illustrative representation in which the upright bars' plates 180 are aligned with the elongated plates 175 of the main body 120 for attachment purposes. The holes 230 on the upright bar's plate 180 align with the holes 230 on the elongated plate. Depending on the specific design, the elongated plates 175 may or may not substantially correspond in shape to the upright bars' plates. Rubber inserts 305 are also utilized in between the elongated plates 175 and the upright bars' plates 180. While rubber inserts are described, other materials that operate as protective inserts are also possible, such as silicone, plastic, latex, a cloth, or other suitable polymer. In typical implementations, the inserts substantially correspond in size and shape of the elongated plates to ensure the metal of the elongated and upright bar plates do not touch and clash together, thereby causing damage or undesired noise.

The rubber inserts 305 may have adhesive on at least one side thereof so that the inserts are pre-installed to the modular grille guard 105. For example, the insert may have an adhesive layer on the side of the elongated plate 175 or the upright bar's plate 180 to reduce the amount of user assembly. In either case, the holes are pre-drilled into the inserts to make assembly easier. In some implementations, multiple inserts may be pre-installed on each component. For example, one insert may be pre-installed and attached against the upright bar's plate, and a second insert may be attached to the surface of the elongated plate, such that, when assembled, the inserts touch and engage with each other.

Figure 4:
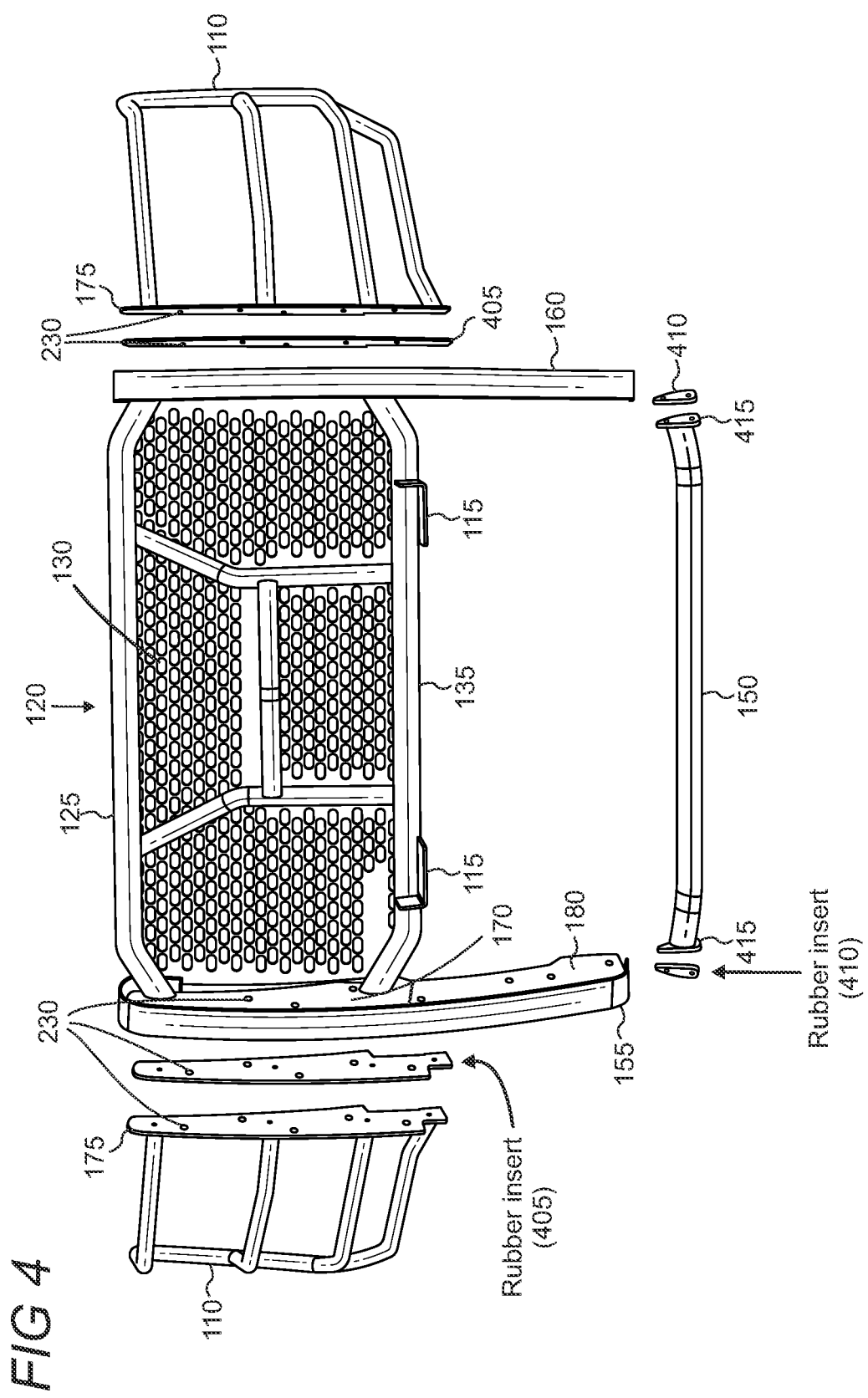
FIG. 4 shows an illustrative representation of the brush guards aligned with the upright bars and main body.

FIG. 4 shows an illustrative representation in which the brush guards 110 are assembled to the upright bars 155, 160 after the upright bars are respectively engaged with the opposing elongated plates 170. The brushguards' elongated plates 175 engage with the exterior side of the upright bars' plates 180. The holes 230 on each member, namely the elongated plate 175, upright bars plate, and main body's elongated plate 170 are aligned so that each component can be attached to each other and assembled using, for example, nuts and bolts. Furthermore, the rubber inserts 305 and 405 between each metal component should also have its holes aligned with each piece to allow the bolts to fully enter the structure. Similar to the rubber inserts shown and described with respect to FIG. 3, the rubber inserts 405 are likewise positioned between the brush guards 110 and the upright bars 155, 160. The rubber inserts may have a shape that is substantially similar in size and shape to the elongated plates 175 to prevent the metal pieces from touching and creating unwanted clatter. Alternatively, the rubber inserts may be slightly larger than the perimeter of the elongated plates 175 to ensure the metal cannot touch. The rubber inserts may be a single unitary piece or, alternatively, may be multiple pieces that operate together. The rubber inserts may be glued to and pre-assembled with the elongated plates 175 or the upright bars' plates 180. Alternatively, the rubber inserts may be separate and require user installation.

FIG. 4 further shows rubber inserts 410 positioned between the bottom tube's plates 415 to likewise prevent the metal from touching. The rubber inserts 410 likewise may comport in shape and size to the bottom tube's plates or may extend beyond the plates' perimeter. The rubber inserts may also be glued to the components already, specifically the plates 415 or the bottom section of the upright bars' plate 180. Alternatively, the inserts may be separate and require user installation.

Figure 5:
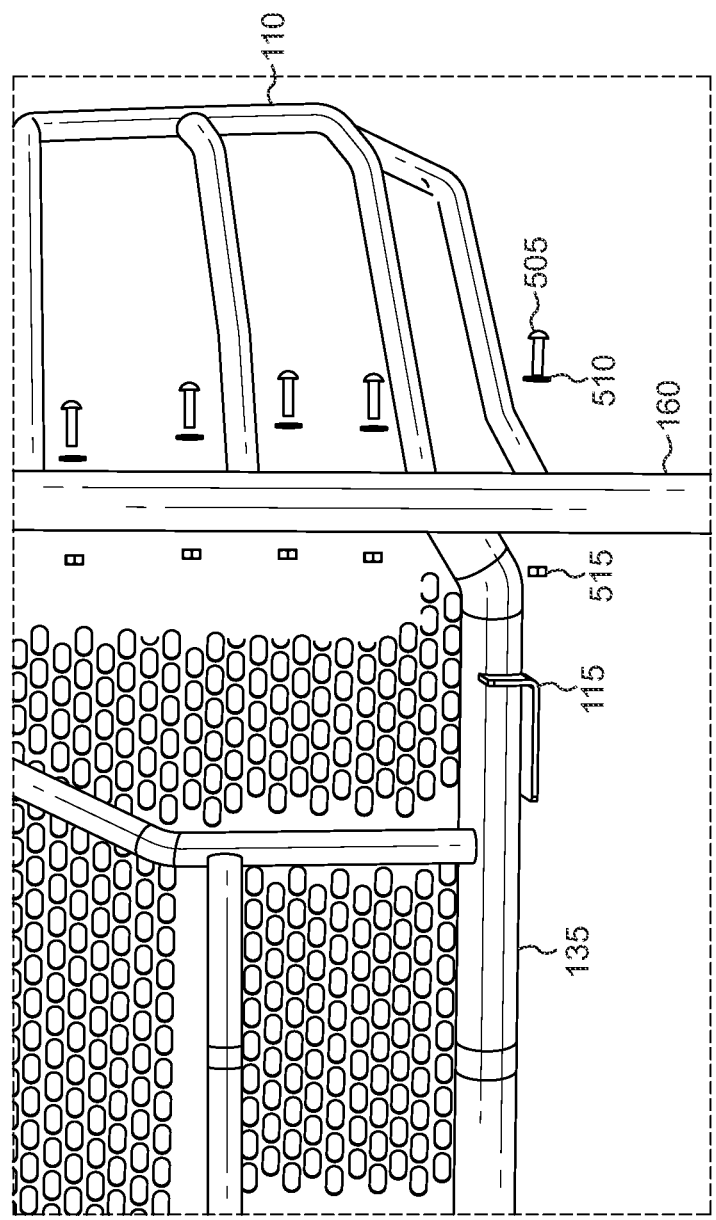
FIG. 5 shows an illustrative representation of a brush guard, upright bar, and main body being secured together via nuts and bolts.

FIG. 5 shows an illustrative representation in which various nuts 515 and bolts 505 extend through the holes 230 assembled components. A portion of the main body's grille has been removed for clarity in exposition. As shown, the bolts extend from the brush guard 110, through the upright bar 160, and ultimately through to the main body 120 to create a unitary structure. Specifically, the bolt extends from the brush guard's elongated plate 175, through the upright bar's plate 180, and ultimately through the main body's elongated plate 170. Washers 510 may also be used with each bolt. The bolt is then secured on the opposite end of the main body's elongated plate 170 to create the assembly. While only a portion of the structure is shown in FIG. 5 for illustrative purposes, the other side of the modular rugged grille guard would be similarly structured and assembled.

Figure 6:
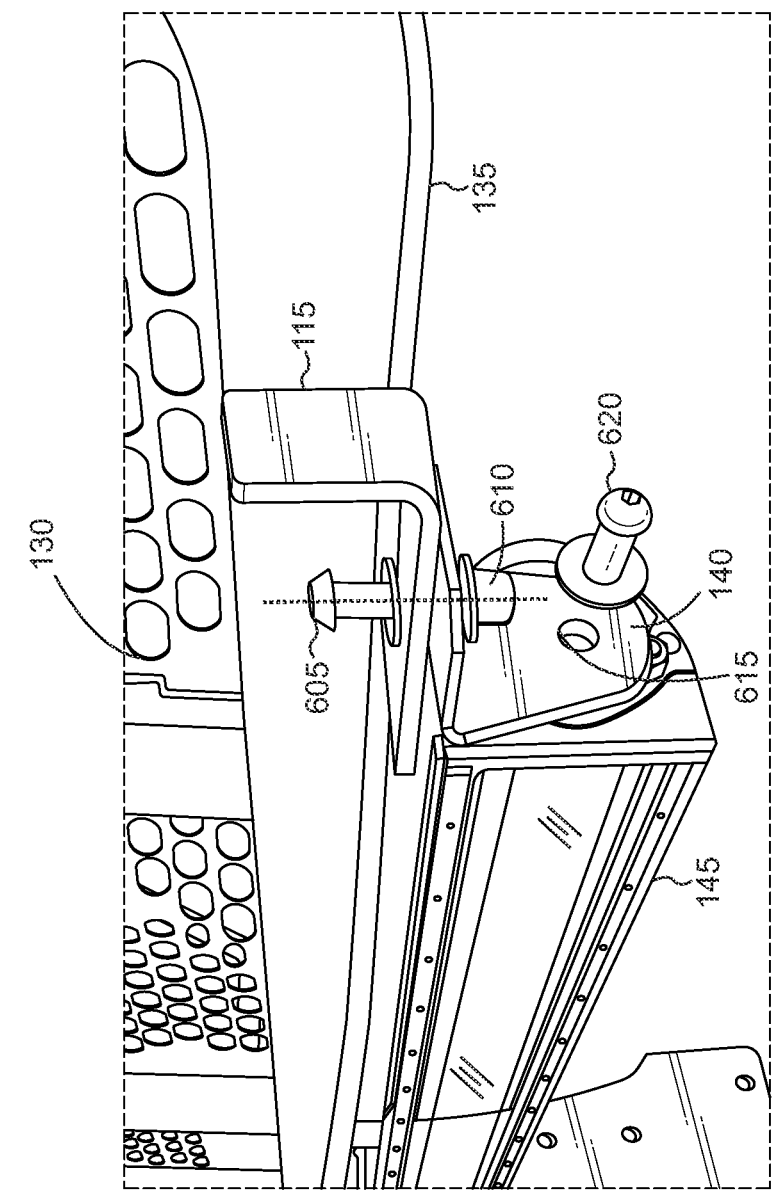
FIG. 6 shows an illustrative representation of the LED (light emitting diode) bracket securing to the main body.

FIG. 6 shows an illustrative representation in which the LED light 145 is assembled to the bottom portion of the main body 120. Specifically, the brackets 140 is attached to the mounts 115 using bolt 605 which aligns with the mount's hole and the bracket's hole. A nut 610 is then secured to the bolt, thereby attaching the two components together. Once the brackets are attached on each side of the LED light, a bolt is then inserted from the mount's bottom hole 615 into a corresponding hole in the LED light's end to secure the two components together. A nut is then secured to the bolt from the LED light for full assembly of the LED light. While only a single side of the LED light's assembly is shown, the other structure is substantially symmetrical; thus, the other side would be similarly assembled.

Figure 7:
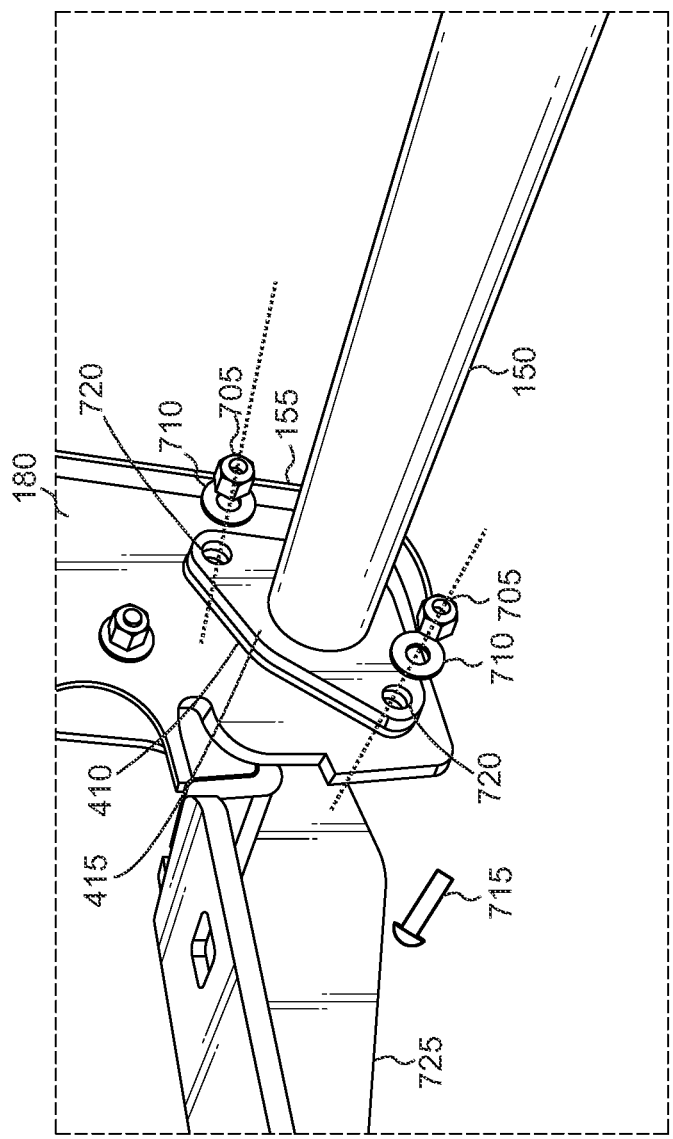
FIG. 7 shows an illustrative representation of the bottom tube or crossguard attaching to the bottom of an upright bar.

FIG. 7 shows an illustrative representation in which the bottom tube 150 is assembled to the upright bar 155. The bottom tube's plate 415 engages with the upright bar's plate 180. The rubber insert 410 is also positioned between the plate 415 and plate 180. The various holes on the plates and rubber insert are aligned to enable users to insert bolts 715 through each component. Once the bolt is inserted, the nuts 710 and washers 705 are secured to the other end of the bolt to have a full assembly. In typical implementations, the bolt may extend from outside the upright bar and be inserted toward the main body 120. Although only a single side of the bottom tube 150 is shown, the other side would be similarly configured and assembled. Furthermore, additional crossguards may be assembled similarly for implementations where multiple crossguards 150 are implemented.

Figure 8:
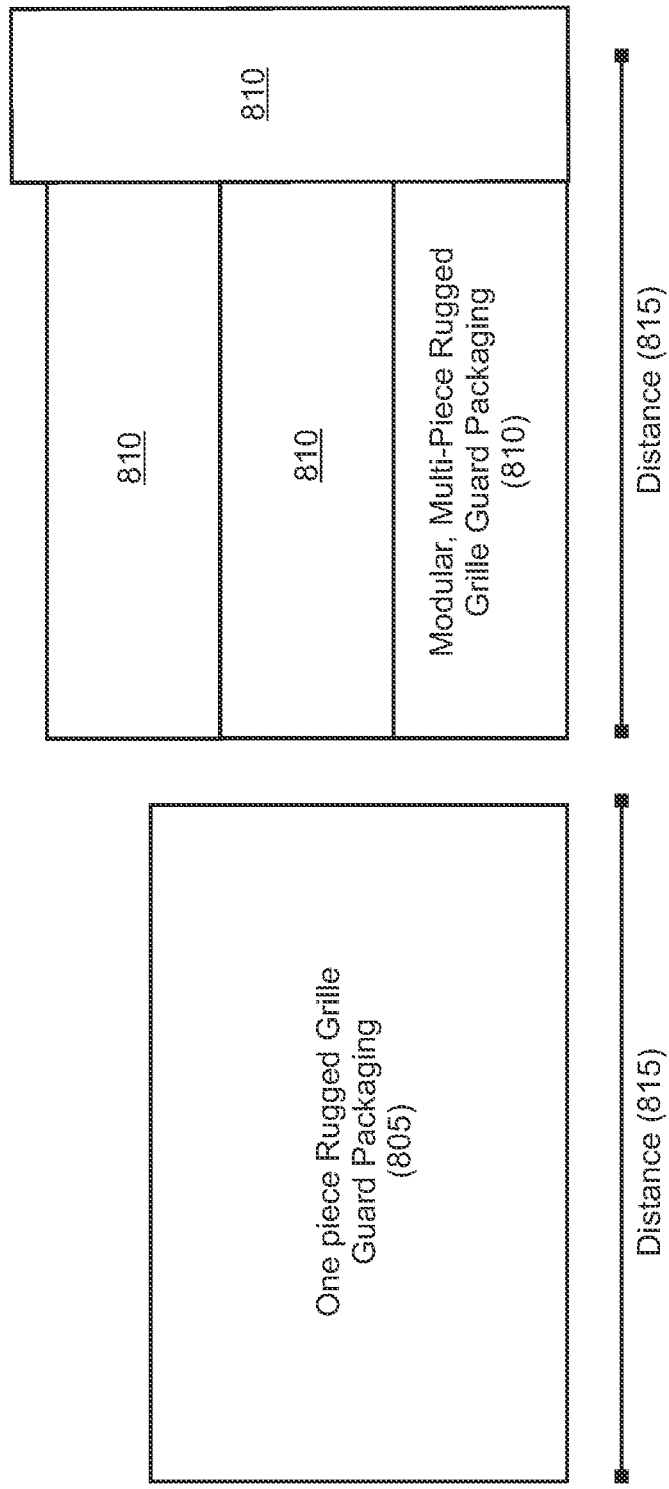
FIG. 8 shows an illustrative representation of packaging differences between a single-piece rugged grille guard and a modular multi-piece grille guard.

FIG. 8 shows an illustrative representation of the difference between the packaging for a three-piece rugged grille guard 805 and the modular, seven-piece rugged grille guard 810. A distance 815 is shown for comparison purposes between the two packaging sets. As shown, while a single distance enables the packaging of a single seven-piece grille guard 805, with only a little more space in each direction, the user can ship up to four total units. On a mass scale of shipping hundreds of units, the cost savings may be cut by at least half and potentially as much as 75%. Such efficient packaging techniques are possible by creating a unique modular grille guard 105 as described above and shown with respect to 1-7.

FIG. 9 shows an illustrative representation of the modular rugged grille guard fully assembled and attached to a pickup truck 905. Thus, while the grille guard is now modular, its appearance and functionality are still substantially the same as if it were not modular.

Various exemplary embodiments are disclosed herein. In one exemplary embodiment, disclosed is a modular grille guard, comprising: an initial brush guard that is initially detached from other components; an initial upright bar that is initially detached from other components; and a main body, wherein the initial upright bar is attachable to the main body, and the initial brush guard is attachable to the initial upright bar to form a secure assembly, in which the initial brush guard attaches to an opposite side of the initial upright bar relative to the main body.

As another example, the initial brush guard, the initial upright bar, and the main body attach to each other using fasteners. In another example, the fasteners are nuts and bolts. In another example, a bolt extends from a plate on the brush guard, through the initial upright bar, and through an elongated plate on the the main body to form a unitary assembly. As another example, an insert positioned between the initial brush guard and the initial upright bar, wherein, when attached, the insert simultaneously touches surfaces of the initial upright bar and the initial brush guard. In another example, an insert positioned between the initial upright bar and the plate of the main body, wherein, when attached, the insert simultaneously touches surfaces of the initial upright bar and the main body. As another example, the inserts are rubber or silicone. In another example, the bolt further extends through the inserts.

In another exemplary embodiment, disclosed is a method of assembling a modular grille guard, comprising: providing an initial brush guard that is initially detached from other components; providing an initial upright bar that is initially detached from other components; providing a main body; attaching the initial upright bar to the main body; attaching the initial brush guard to the initial upright bar to form a secure assembly, in which the initial brush guard attaches to an opposite side of the initial upright bar relative to the main body.

As another example, the initial brush guard, the initial upright bar, and the main body attach to each other using fasteners. As another example, the fasteners are nuts and bolts. In another example, a bolt extends from a plate on the brush guard, through the initial upright bar, and through an elongated plate on the main body to form a unitary assembly. In a further example, an insert positioned between the initial brush guard and the initial upright bar, wherein, when attached, the insert simultaneously touches surfaces of the initial upright bar and the initial brush guard. In a further example, an insert positioned between the initial upright bar and the plate of the main body, wherein, when attached, the insert simultaneously touches surfaces of the initial upright bar and the main body. As another example, the inserts are rubber or silicone. As another example, the bolt further extends through the inserts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A modular grille guard, comprising:
 a main body;
 an initial brush guard that is initially detached from other components;
 an initial upright bar that is initially detached from other components, wherein the initial upright bar extends at least 50% of a vertical length of the main body,
 wherein the initial upright bar is attachable to the main body, and the initial brush guard is attachable to the initial upright bar to form a secure assembly, in which the initial brush guard attaches to an opposite side of the initial upright bar relative to the main body, and
 wherein a fastener extends from a plate on the brush guard, through the initial upright bar, and through an elongated plate on the main body to form a unitary assembly.

2. The modular grille guard of claim 1, wherein the initial brush guard, the initial upright bar, and the main body attach to each other using fasteners.

3. The modular grille guard of claim 2, wherein the fasteners are nuts and bolts.

4. The modular grille guard of claim 1, further comprising an insert positioned between the initial brush guard and the initial upright bar, wherein, when attached, the insert simultaneously touches surfaces of the initial upright bar and the initial brush guard.

5. The modular grille guard of claim 4, further comprising an insert positioned between the initial upright bar and the plate of the main body, wherein, when attached, the insert simultaneously touches surfaces of the initial upright bar and the main body.

6. The modular grille guard of claim 5, wherein the inserts are rubber or silicone.

7. The modular grille guard of claim 6, wherein the fastener further extends through the inserts.

8. A method of assembling a modular grille guard, comprising:
 providing a main body;
 providing an initial brush guard that is initially detached from other components;
 providing an initial upright bar that is initially detached from other components;
 attaching the initial upright bar to the main body, wherein the initial upright bar extends at least 50% of a vertical length of the main body;
 attaching the initial brush guard to the initial upright bar to form a secure assembly, in which the initial brush guard attaches to an opposite side of the initial upright bar relative to the main body,
 wherein a bolt extends from a plate on the brush guard, through the initial upright bar, and through an elongated plate on the main body to form a unitary assembly.

9. The method of claim 8, wherein the initial brush guard, the initial upright bar, and the main body attach to each other using fasteners.

10. The method of claim 9, wherein the fasteners are nuts and bolts.

11. The method of claim 8, further comprising an insert positioned between the initial brush guard and the initial upright bar, wherein, when attached, the insert simultaneously touches surfaces of the initial upright bar and the initial brush guard.

12. The method of claim 11, further comprising an insert positioned between the initial upright bar and the plate of the main body, wherein, when attached, the insert simultaneously touches surfaces of the initial upright bar and the main body.

13. The method of claim 12, wherein the inserts are rubber or silicone.

14. The method of claim 13, wherein the fastener further extends through the inserts.

* * * * *